US012603418B2

(12) United States Patent　　(10) Patent No.:　US 12,603,418 B2

Kim et al.　　(45) Date of Patent:　Apr. 14, 2026

(54) ANTENNA FOR CHARGING AND MEASUREMENT, AND METHOD AND APPARATUS FOR MEASURING RADIO WAVES AND WIRELESS CHARGING USING THE SAME

(71) Applicant: Electronics and Telecommunications Research Institute, Daejeon (KR)

(72) Inventors: Seong Min Kim, Daejeon (KR); Sang Won Kim, Daejeon (KR); Jung Ick Moon, Daejeon (KR); Je Hoon Yun, Daejeon (KR); In Kui Cho, Daejeon (KR); Gwang Zeen Ko, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 754 days.

(21) Appl. No.: 18/090,112

(22) Filed: Dec. 28, 2022

(65) Prior Publication Data

US 2023/0335889 A1　　Oct. 19, 2023

(30) Foreign Application Priority Data

Apr. 15, 2022　(KR) ........................ 10-2022-0046957

(51) Int. Cl.
*H01Q 1/28* 　　(2006.01)
*B60L 53/12* 　　(2019.01)
(Continued)

(52) U.S. Cl.
CPC ................ *H01Q 1/28* (2013.01); *B60L 53/12* (2019.02); *B60L 53/30* (2019.02); *B60L 53/36* (2019.02);
(Continued)

(58) Field of Classification Search
CPC .. H01Q 1/28; H01Q 1/10; H01Q 7/00; H01Q 7/0048; H01Q 7/02; B64C 39/024;
(Continued)

(56) References Cited

U.S. PATENT DOCUMENTS 10,366,828 B2 * 7/2019 Park ...................... H01F 27/006
10,439,450 B2 10/2019 Lee et al.
(Continued)

FOREIGN PATENT DOCUMENTS

KR 　　　10-1737219 　　　5/2017
KR 　10-2020-0120841 　　10/2020
(Continued)

*Primary Examiner* — David V Henze-Gongola

(74) *Attorney, Agent, or Firm* — KILE PARK REED & HOUTTEMAN PLLC

(57) ABSTRACT

An antenna for charging and measurement may comprise: a telescopic support installed at a lower portion of an aerial vehicle and configured to contract when the aerial vehicle lands on a wireless station and extend when the aerial vehicle takes off from the wireless station; and an antenna coil part deformed into a spiral shape when the telescopic support is contracted so that the wireless station receives wireless power and deformed into a conical shape when the telescopic support is extended to measure a radio signal.

16 Claims, 10 Drawing Sheets

(51) Int. Cl.

| | |
|---|---|
| *B60L 53/30* | (2019.01) |
| *B60L 53/36* | (2019.01) |
| *B60L 53/38* | (2019.01) |
| *B60L 53/62* | (2019.01) |
| *B64C 39/02* | (2023.01) |
| *B64U 20/80* | (2023.01) |
| *B64U 50/38* | (2023.01) |
| *B64U 70/90* | (2023.01) |
| *G05D 1/00* | (2024.01) |
| *H01Q 1/10* | (2006.01) |
| *H01Q 7/00* | (2006.01) |
| *H02J 7/00* | (2026.01) |
| *H02J 50/00* | (2016.01) |
| *H02J 50/20* | (2016.01) |

(52) U.S. Cl.
CPC .............. *B60L 53/38* (2019.02); *B60L 53/62* (2019.02); *B64C 39/024* (2013.01); *B64U 20/80* (2023.01); *B64U 50/38* (2023.01); *B64U 70/90* (2023.01); *G05D 1/042* (2013.01); *H01Q 1/10* (2013.01); *H01Q 7/00* (2013.01); *H02J 7/0048* (2020.01); *H02J 50/005* (2020.01); *H02J 50/20* (2016.02); *B60L 2200/10* (2013.01)

(58) Field of Classification Search
CPC . B64C 1/36; H02J 50/005; H02J 50/10; H02J 50/90; H02J 7/025; B60L 53/12; B60L 53/30; B60L 53/36; B60L 53/38; B60L 53/62; B60L 2200/10; B64U 20/80; B64U 50/38; B64U 50/34; B64U 50/19; B64U 50/30–39; B64U 2200/10; B64U 70/90; B64U 2101/00; G05D 1/042; G01R 31/387; G01R 29/0878; G01S 15/08; Y02T 50/50
See application file for complete search history.

(56) References Cited

U.S. PATENT DOCUMENTS

| | | | |
|---|---|---|---|
| 10,782,333 B2 | 9/2020 | Homma et al. | |
| 2020/0229206 A1 | 7/2020 | Badic et al. | |
| 2020/0280216 A1 | 9/2020 | Pei et al. | |
| 2020/0337110 A1 | 10/2020 | Kim | |
| 2020/0408876 A1 | 12/2020 | Weber et al. | |
| 2021/0265862 A1 | 8/2021 | Yeo et al. | |
| 2021/0351630 A1 | 11/2021 | Kim et al. | |
| 2023/0039483 A1* | 2/2023 | Strobel ................. | B64U 70/95 |

FOREIGN PATENT DOCUMENTS

| | | |
|---|---|---|
| KR | 10-2282893 | 7/2021 |
| WO | 2020/213980 | 10/2020 |

* cited by examiner 401-1
401-2
401-3
402
403
403-1
404

ANTENNA FOR CHARGING AND MEASUREMENT, AND METHOD AND APPARATUS FOR MEASURING RADIO WAVES AND WIRELESS CHARGING USING THE SAME

CROSS-REFERENCE TO RELATED APPLICATIONS

This application claims priority to Korean Patent Application No. 10-2022-0046957, filed on Apr. 15, 2022 with the Korean Intellectual Property Office (KIPO), the entire contents of which are hereby incorporated by reference.

BACKGROUND

1. Technical Field

Example embodiments of the present disclosure relate to an antenna and a technology for wireless charging and radio wave measurement using the antenna, and more particularly, to an antenna for wireless charging and radio wave measurement and a technology for wireless charging and radio wave measurement, which is capable of performing wireless charging and radio wave measurement using the antenna.

2. Related Art

With the development of information and communication technologies, various wireless communication technologies are being developed. As the representative wireless communication technologies, there may be long term evolution (LTE), new radio (NR), or the like defined as the 3rd generation partnership project (3GPP) specifications. The LTE may be one of 4th generation (4G) wireless communication technologies, and the NR may be one of 5th generation (5G) wireless communication technologies.

For the processing of rapidly increasing wireless data after the commercialization of the 4th generation (4G) communication system (e.g., Long Term Evolution (LTE) communication system or LTE-Advanced (LTE-A) communication system), the 5th generation (5G) communication system (e.g., new radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered. The 5G communication system may support enhanced Mobile BroadBand (eMBB), Ultra-Reliable and Low-Latency Communication (URLLC), and massive Machine Type Communication (mMTC).

Systems using aerial vehicles (e.g., drones) are being developed in various fields such as logistics, surveillance, and a military field. One of the systems may be a system for radio wave measurement and monitoring, which measures radio waves using an aerial vehicle to monitor the radio waves. In the system for radio wave measurement and monitoring using an aerial vehicle, the aerial vehicle can measure an output signal of a radio device or a radio station in an environment difficult to reach by people, such as a rooftop or steel tower, and transmit the output signal to a management device on the ground. In this case, it may be difficult to accurately measure radio waves because an operating time of the aerial vehicle is short.

SUMMARY

Accordingly, example embodiments of the present disclosure are provided to substantially obviate one or more problems due to limitations and disadvantages of the related art. Example embodiments of the present disclosure provide an antenna for wireless charging and radio wave measurement and an apparatus and method for wireless charging and radio wave measurement, which are capable of performing wireless charging of an aerial vehicle using the antenna and measuring radio waves from a radio station around the aerial vehicle.

According to a first exemplary embodiment of the present disclosure, an antenna for charging and measurement may comprise: a telescopic support installed at a lower portion of an aerial vehicle and configured to contract when the aerial vehicle lands on a wireless station and extend when the aerial vehicle takes off from the wireless station; and an antenna coil part deformed into a spiral shape when the telescopic support is contracted so that the wireless station receives wireless power and deformed into a conical shape when the telescopic support is extended to measure a radio signal.

The telescopic support may include multi-stage tubular bodies having different diameters connected to be extendible and contractible; and the antenna coil part may include an antenna coil which is wound in a form in which a radius of a loop is increased from a bottom surface in a direction opposite to the bottom surface along surfaces of the multi-stage tubular bodies.

The telescopic support may further include a telescopic member installed to pass through a center of the multi-stage tubular bodies and configured to contract or extend the multi-stage tubular bodies; and the antenna for charging and measurement may further include an antenna deformation part configured to move the telescopic member in a direction perpendicular to the bottom surface.

The telescopic support may be contracted by a surface of the wireless station when the aerial vehicle lands on the wireless station, and the telescopic support may be extended by gravity when the aerial vehicle takes off from the wireless station.

According to a second exemplary embodiment of the present disclosure, a method of operating an aerial vehicle including an antenna for charging and measurement may comprise: receiving wireless power from a wireless station using an antenna coil of the antenna for charging and measurement deformed into a spiral shape when the aerial vehicle lands on the wireless station; and measuring radio signals of the surroundings using the antenna coil of the antenna for charging and measurement deformed into a conical shape when the aerial vehicle takes off from the wireless station.

The deformation of the antenna coil into the spiral shape may include deformation in which, when the aerial vehicle lands on the wireless station, the telescopic support of the antenna for charging and measurement is contracted by a surface of the wireless station so that a shape of the antenna coil wound on the telescopic support is deformed into the spiral shape.

The deformation of the antenna coil into the conical shape may include deformation in which, when the aerial vehicle takes off from the wireless station, the telescopic support of the antenna for charging and measurement is extended due to gravity so that a shape of the antenna coil wound on the telescopic support is deformed into the conical shape.

The method may further comprise: checking a remaining amount of a rechargeable battery provided in the aerial vehicle while the aerial vehicle takes off from the wireless station and measures radio signals; determining whether the remaining amount of the rechargeable battery is less than or equal to a predetermined reference; and when it is determined that the remaining amount of the rechargeable battery is less than or equal to the predetermined reference, moving the aerial vehicle to land on the wireless station.

The predetermined reference may be a remaining amount of the rechargeable battery that is less than or equal to a predetermined percentage of a charging capacity of the rechargeable battery.

The predetermined reference may be for determining whether the remaining amount of the rechargeable battery is sufficient for the aerial vehicle to move to a next radio wave measurement point, perform radio wave measurement, and then move to the wireless station.

The method may further comprise: checking a remaining amount of a rechargeable battery provided in the aerial vehicle while the aerial vehicle lands on the wireless station and receives wireless power; determining whether the remaining amount of the rechargeable battery is greater than or equal to a predetermined reference; and when it is determined that the remaining amount of the rechargeable battery is greater than or equal to the predetermined reference, stopping reception of the wireless power at the wireless station.

The method may further comprise: measuring a distance to a radio wave source of the radio signal after the aerial vehicle takes off from the wireless station and measures the radio signal; and transmitting position information on the aerial vehicle, measurement information on the radio signal, and information on the distance of the radio source to a management device.

According to a third exemplary embodiment of the present disclosure, an aerial vehicle may comprise: a processor; an antenna that performs charging and measurement; a memory configured to electronically communicate with the processor; and instructions stored in the memory, wherein, when the instructions are executed by the processor, the instructions cause the aerial vehicle to: receive wireless power from a wireless station using an antenna coil of the antenna for charging and measurement deformed into a spiral shape when landing on the wireless station; and measure radio signals around the aerial vehicle using the antenna coil of the antenna for charging and measurement deformed into a conical shape when the aerial vehicle takes off from the wireless station.

The instructions may further cause the aerial vehicle to: check a remaining amount of a rechargeable battery provided in the aerial vehicle while the aerial vehicle takes off from the wireless station and measures radio signals; determine whether the remaining amount of the rechargeable battery is less than or equal to a predetermined reference; and when it is determined that the remaining amount of the rechargeable battery is less than or equal to the predetermined reference, move the aerial vehicle to land on the wireless station.

The instructions may further cause the aerial vehicle to: check a remaining amount of a rechargeable battery provided in the aerial vehicle while the aerial vehicle lands on the wireless station and receives wireless power; determine whether the remaining amount of the rechargeable battery is greater than or equal to a predetermined reference; and when it is determined that the remaining amount of the rechargeable battery is greater than or equal to the predetermined reference, stop reception of the wireless power at the wireless station.

The instructions may further cause the aerial vehicle to: measure a distance to a radio wave source of the radio signal after the aerial vehicle takes off from the wireless station and measures the radio signal; and transmit position information on the aerial vehicle, measurement information on the radio signal, and information on the distance of the radio source to a management device.

In accordance with the present disclosure, an aerial vehicle can change a shape of a mounted antenna when taking off from a wireless station to a conical shape using gravity or a small motor. In addition, when landing on the wireless station, the aerial vehicle can change the shape of the mounted antenna to a spiral shape using an upper surface of the wireless station or a small motor.

As described above, when taking off from the wireless station, the aerial vehicle can measure radio waves generated from nearby wireless devices or radio stations after changing the shape of the mounted antenna to a conical shape. In addition, when landing on the wireless station, the aerial vehicle can receive wireless power from the wireless station after changing the shape of the mounted antenna to a spiral shape, thereby performing wireless charging of a rechargeable battery.

In this way, since the aerial vehicle can perform the wireless charging and radio wave measurement using one antenna, a weight can be reduced compared to when antennas for performing each function are mounted on the aerial vehicle. Consequently, an operating time of the aerial vehicle can be increased. In addition, an operating area of the aerial vehicle can be increased.

BRIEF DESCRIPTION OF DRAWINGS

FIG. 12 is a block diagram illustrating a first embodiment of a wireless charging and radio wave measurement system.

DETAILED DESCRIPTION OF THE EMBODIMENTS

Figure 1:
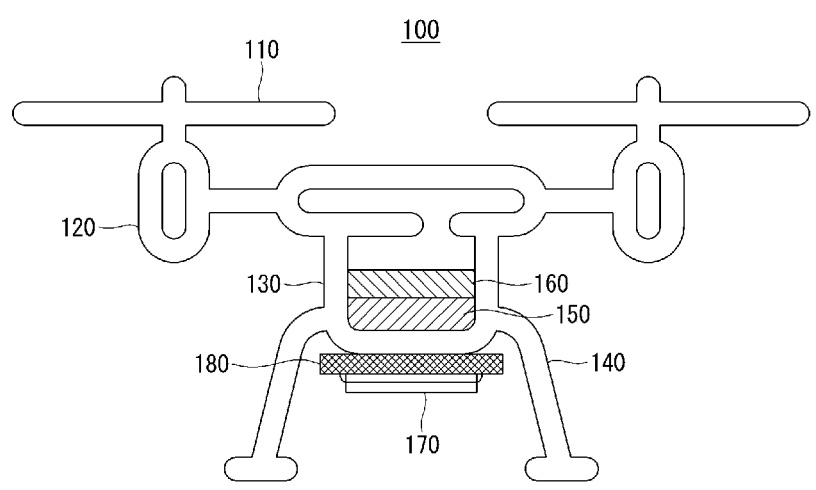
FIG. 1 is a conceptual diagram illustrating a first embodiment of an aerial vehicle including an antenna for charging and measurement.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, beyond 5G (B5G) mobile communication network (e.g., 6G mobile communication network), or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

Systems using aerial vehicles (e.g., drones) are being developed in various fields such as logistics, surveillance, and a military field. One of the systems may be a system for radio wave measurement and monitoring, which measures radio waves using an aerial vehicle to monitor the radio waves. In the system for radio wave measurement and monitoring using an aerial vehicle, the aerial vehicle can measure an output signal of a radio device or a radio station in an environment difficult to reach by people, such as a rooftop or steel tower, and transmit the output signal to a management device on the ground. In this case, it may be difficult to accurately measure radio waves because an operating time of the aerial vehicle is short. In addition, since a battery in the aerial vehicle is formed to be replaced by a person, this can be inefficient.

A technology proposed to solve the problem of such a battery replacement method may be a wireless charging technology. The wireless charging technology may have various methods of using a magnetic field, a laser, a microwave, and the like. Among the above various methods, the most efficient and fast battery charging method may be a wireless charging method using a magnetic field. Currently, various wireless charging technologies for aerial vehicles are being proposed in order to increase an operating time of the aerial vehicle, expand a service area, and efficiently automatically operate the aerial vehicle.

In this regard, a radio wave measurement system using a drone, to which an antenna for radio wave measurement, a data storage, and communication equipment are attached, may measure an intensity of radio waves generated from a radio wave source such as a radio station located on the roof of a building or a steel tower. A radio wave measurement system using a drone capable of performing radio wave environment measurement and analysis according to altitude is disclosed. In such a radio wave measurement and monitoring system, the drone may include an antenna for radio wave measurement, a storage for storing the measured radio wave measurement data, and a transmission device for transmitting measured data to the ground through wireless fidelity (Wi-Fi) communication.

As described above, the aerial vehicle equipped with various devices may provide a service for measuring and monitoring radio waves transmitted from a wireless device or a radio station in an area difficult to access by people. However, an operating time of the aerial vehicle is shortened due to the devices installed therein so that a service area may be reduced. As a method of solving the above problem, a wireless charging technology of charging a battery in a wireless manner may be applied to a drone.

Meanwhile, a system for providing wireless charging to an aerial vehicle may employ a method of recognizing a landing of an aerial vehicle at a wireless charging station and automatically providing wireless charging. In this regard, a maritime reconnaissance drone system including a wireless charging module may offer an efficient drone landing system and a method capable of solving problems such as efficiency degradation and heat due to a landing error of a drone. The wireless charging system may include an antenna or a coil capable of receiving power in a wireless manner at a lower portion of the drone and receive power for wireless charging from a bottom surface after landing.

As described above, in the radio wave measurement and monitoring system using an aerial vehicle, there may be a need for increasing the operating time of the aerial vehicle. In addition, in the radio wave measurement and monitoring system using an aerial vehicle, there may be a need for expanding an operating area. To this end, the radio wave measurement and monitoring system using an aerial vehicle may employ a wireless charging technology. However, when the aerial vehicle is simultaneously equipped with a device for radio wave measurement and monitoring and a device for wireless charging, a weight of the aerial vehicle may be increased. As a result, the operating time of the aerial vehicle may be further reduced and the operating area thereof may be reduced. Accordingly, the present disclosure may propose an antenna for radio wave measurement and wireless charging. In addition, the present disclosure may propose a method and an apparatus for measuring radio waves using such an antenna.

FIG. 1 is a conceptual diagram illustrating a first embodiment of an aerial vehicle including an antenna for charging and measurement.

Referring to FIG. 1, an aerial vehicle 100 may include a plurality of propellers 110, a plurality of drivers 120, a body 130, a pair of landing legs 140, a rechargeable battery 150, a controller 160, an antenna 170, and an integrated receiver 180. Here, the plurality of propellers 110 may generate lift and flying power. In addition, each of the drivers 120 may drive a corresponding propeller 110. The plurality of drivers 120 may be mounted on the body 130. The pair of landing legs 140 may be installed to extend downward from both ends of the body 130 and may land on a wireless station. Next, the rechargeable battery 150 may supply power to the plurality of drivers 120, the controller 160, the antenna 170, and the integrated receiver 180.

Here, the controller 160 may control the plurality of drivers 120 to drive the plurality of propellers 110, thereby allowing the aerial vehicle 100 to take off from the wireless station and fly. In this case, the controller 160 may control the antenna 170 to receive radio waves generated from nearby wireless devices or radio stations. In addition, the controller 160 may control the integrated receiver 180 to measure the magnitude and phase of the radio waves which are generated from the nearby wireless devices or the radio stations and received by the antenna 170. Meanwhile, the controller 160 may control the plurality of drivers 120 to drive the plurality of propellers 110, thereby allowing the aerial vehicle 100 to land on the wireless station. In addition, the controller 160 may control the antenna 170 to receive wireless power from the wireless station. In this case, the controller 160 may control the integrated receiver 180 to charge the rechargeable battery 150 using the wireless power received from the antenna 170. The controller 160 may be shown in FIG. 2.

Figure 2:
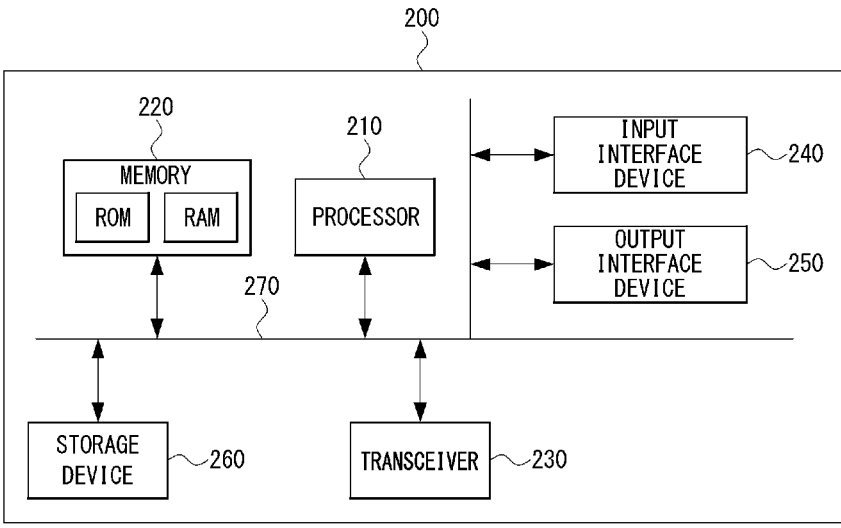
FIG. 2 is a block diagram illustrating a first embodiment of a controller constituting an aerial vehicle.

FIG. 2 is a block diagram illustrating a first embodiment of a controller constituting an aerial vehicle.

Referring to FIG. 2, a controller 200 may include at least one processor 210, a memory 220, and a transceiver 230 connected to a network and configured to perform communication. In addition, the controller 200 may further include an input interface 240, an output interface 250, and a storage 260. The components included in the controller 200 may be connected through a bus 270 to communicate with each other. However, instead of the common bus 270, each component included in the controller 200 may be connected through an individual interface or an individual bus centered on the processor 210. For example, the processor 210 may be connected to at least one of the memory 220, the transceiver 230, the input interface 240, the output interface 250, and the storage 260 through a dedicated interface.

The processor 210 may execute a program command stored in at least one of the memory 220 and the storage 260. The processor 210 may refer to a central processing unit (CPU), a graphics processing unit (GPU), or a dedicated processor in which methods according to embodiments of the present disclosure are performed. Each of the memory 220 and the storage 260 may be formed as at least one of a volatile storage medium and a non-volatile storage medium. For example, the memory 220 may be formed as at least one of a read only memory (ROM) and a random access memory (RAM).

Referring to FIG. 1 again, the controller 160 may transmit radio wave measurement information on the magnitude and phase of the radio waves measured through the integrated receiver 180 to the wireless station or a management device through the transceiver 230 provided in the controller 160.

Figure 3:
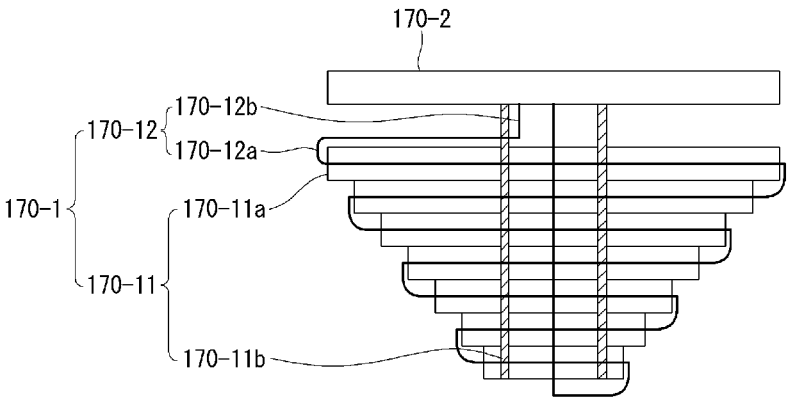
FIG. 3 is a conceptual diagram illustrating a first embodiment of an antenna.

Meanwhile, as shown in FIG. 3, the antenna 170 may include an antenna part 170-1 and an antenna deformation part 170-2.

FIG. 3 is a conceptual diagram illustrating a first embodiment of an antenna.

Referring to FIG. 3, the antenna may include the antenna part 170-1 and the antenna deformation part 170-2. In addition, the antenna part 170-1 may include a telescopic support 170-11 and an antenna coil part 170-12. Here, the telescopic support 170-11 may include multi-stage tubular bodies 170-11a which have different diameters and are mutually elastically connected, and a telescopic member 170-11b capable of contracting or extending the multi-stage tubular bodies 170-11a.

Figure 4A:
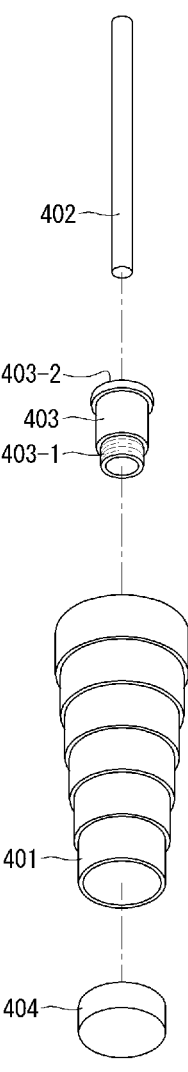
FIGS. 4A and 4B are conceptual diagrams illustrating a first embodiment of a telescopic support.
Figure 4B:
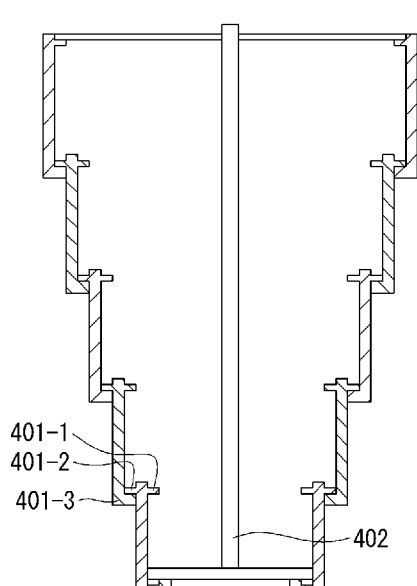

FIGS. 4A and 4B are conceptual diagrams illustrating a first embodiment of a telescopic support.

Referring to FIGS. 4A and 4B, the telescopic support may include multi-stage tubular bodies 401, a telescopic member 402, a support tubular body 403, and an adjuster 404. Here, each multi-stage tubular body 401 may have a locking jaw 401-1 which is caught on a fixing jaw 403-2 of the support tubular body 403 when coupled. In addition, a separation prevention jaw 401-2 and a telescopic stop jaw 401-3 for uniformly blocking the degree of expansion and contraction of each multi-stage tubular body 401 may be formed on an outer circumferential surface of each multi-stage tubular body 401. Here, the separation prevention jaw 401-2 may prevent excessive expansion during expansion. In addition, the telescopic stop jaw 401-3 may prevent excessive contraction during contraction. As described above, the separation prevention jaw 401-2 and the telescopic stop jaw 401-3 may prevent the multi-stage tubular bodies 401 from being separated from each other.

The telescopic member 402 may be coupled to the support tubular body 403 by a fitting or screw coupling manner. The telescopic member 402 may be moved by the antenna deformation part in a vertical direction away from the adjuster 404 to contract the multi-stage tubular bodies 401 by the support tubular body 403. In addition, the telescopic member 402 may be moved by the antenna deformation part in the vertical direction toward the adjuster 404 to extend the multi-stage tubular bodies 401 by the support tubular body 403. In addition, the support tubular body 403 may be fixed to and brought into close contact with the telescopic member 402, and a threaded portion 403-1 and a fixing jaw 403-2 may be formed. In this case, the support tubular body 403 may be manufactured to be properly installed by a fitting method or a screw coupling method by varying a length or a diameter according to a shape of the telescopic member 402 having various shapes. Meanwhile, the adjuster 404 may prevent the multi-stage tubular bodies 401, which are screw-coupled to a threaded portion 403-1 of the support tubular body 403 and inserted into and supported by the support tubular body 403, from being separated. The telescopic support may be assembled such that the support tubular body 403 is press-fixed to the telescopic member 402, and the adjuster 404 is finally fastened to the threaded portion 403-1 of the support tubular body 403 in a state in which the multi-stage tubular bodies 401 are inserted.

Figure 5:
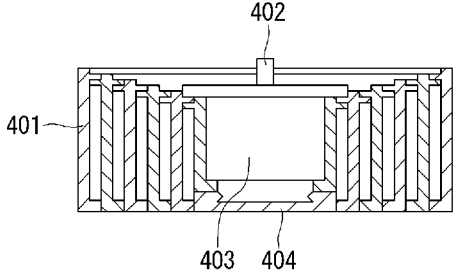
FIG. 5 is a conceptual diagram illustrating a first embodiment of a contracted state of the telescopic support.

FIG. 5 is a conceptual diagram illustrating a first embodiment of a contracted state of the telescopic support.

Referring to FIG. 5, in the telescopic support, the telescopic member 402 may be moved away from the adjuster 404 by the antenna deformation part. Then, the entirety of the multi-stage tubular bodies 401 may be contracted by being moved in a sliding manner based on the support tubular body 403. Conversely, in the telescopic support, the telescopic member 402 may be moved toward the adjuster 404 by the antenna deformation part. Then, the entirety of the multi-stage tubular bodies 401 may be extended by being moved in a sliding manner based on the support tubular body 403. As described above, the telescopic member 402 is pushed by the antenna deformation part so that the multi-stage tubular bodies 401 may be extended.

Referring to FIG. 3 again, the antenna coil part 170-12 may be formed as an antenna coil 170-12a wound in a conical shape in which a radius of a loop is increased from a bottom surface in a direction opposite to the bottom surface along surfaces of the multi-stage tubular bodies 401 of the telescopic support 170-11. As described above, in the antenna coil part 170-12, when the telescopic support 170-11 is extended, the antenna coil 170-12a may have a wide conical shape. Accordingly, when the aerial vehicle takes off from the wireless station, the antenna coil 170-12a of the antenna coil part 170-12 may receive radio waves generated from nearby wireless devices or radio stations. The antenna coil part 170-12 may include an output coil 170-12b for transmitting a signal received from the antenna coil.

Figure 6:
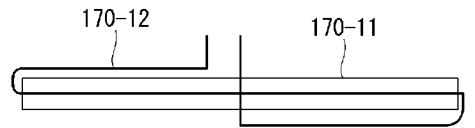
FIG. 6 is a side view illustrating a first embodiment of the antenna in a contracted state of the telescopic support.

FIG. 6 is a side view illustrating a first embodiment of the antenna in a contracted state of the telescopic support. In addition, FIG. 7 is a plan view illustrating a first embodiment of the antenna coil part in the contracted state of the telescopic support.

Figure 7:
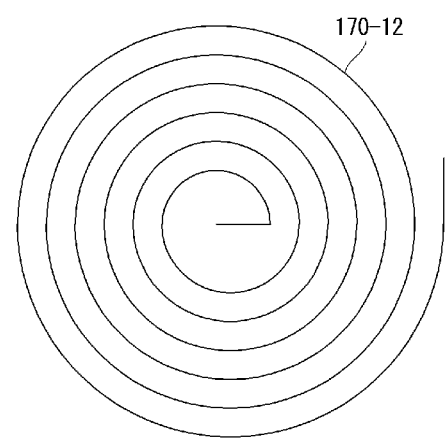
FIG. 7 is a plan view illustrating a first embodiment of the antenna coil part in the contracted state of the telescopic support.

Referring to FIGS. 6 and 7, when the telescopic support 170-12 is contracted, the antenna coil of the antenna coil part 170-12 in the antenna part may have a spiral shape, and thus when the drone lands on the wireless station, wireless power may be received from the wireless station.

Referring to FIG. 3 again, the antenna deformation part 170-2 may include a small motor. Meanwhile, the aerial vehicle may take off from the wireless station. Then, the antenna deformation part 170-2 may drive the small motor to vertically move the telescopic member 170-11b away from the antenna deformation part 170-2, thereby extending the multi-stage tubular body parts 170-11a. In the above situation, the antenna coil 170-12a of the antenna coil part 170-12 may have a wide conical shape. Accordingly, the antenna coil 170-12a of the antenna coil part 170-12 may receive and measure radio waves generated from nearby wireless devices or radio stations.

On the other hand, the aerial vehicle may land on the wireless station. In this case, the antenna deformation part 170-2 may drive the small motor to vertically move the telescopic member 170-11b toward the antenna deformation part 170-2, thereby contracting the multi-stage tubular body parts 170-11a. In the above situation, the antenna coil part 170-12 may have a spiral shape. In this way, when the aerial vehicle lands on the wireless station, the antenna coil 170-12a of the antenna coil part 170-12 may receive wireless power from the wireless station. As described above, when the antenna deformation part 170-2 is capable of extending or contracting the multi-stage tubular body parts 170-11a, a height of the antenna coil part 170-12 may be freely set. However, when the antenna part includes the antenna deformation part 170-2, a weight may be increased. In addition, when the antenna part includes the antenna deformation part 170-2, the antenna part may have a complicated structure.

Alternatively, the antenna 170 may not include the antenna deformation part. In this case, the telescopic support 170-11 of the antenna part 170-1 may extend and contract due to gravity. That is, when the aerial vehicle lands on the wireless station, the telescopic support 170-11 of the antenna part 170-1 may be attached to the surface of the wireless station and contracted. On the other hand, when the aerial vehicle takes off from the wireless station, the telescopic support 170-11 of the antenna part 170-1 may be extended downward due to gravity. In this case, a height of the outermost bottom surface of the telescopic support 170-11 may exactly match a bottom surface of the aerial vehicle. Thus, a height of the antenna coil part 170-12 may be completely folded when landing on the wireless station, and thus a shape thereof may become a spiral shape. As described above, when the antenna 170 does not include the antenna deformation part, the shape of the antenna may be automatically deformed due to gravity during the take-off of the aerial vehicle so that the antenna 170 may be relatively simply controlled.

Figure 8:
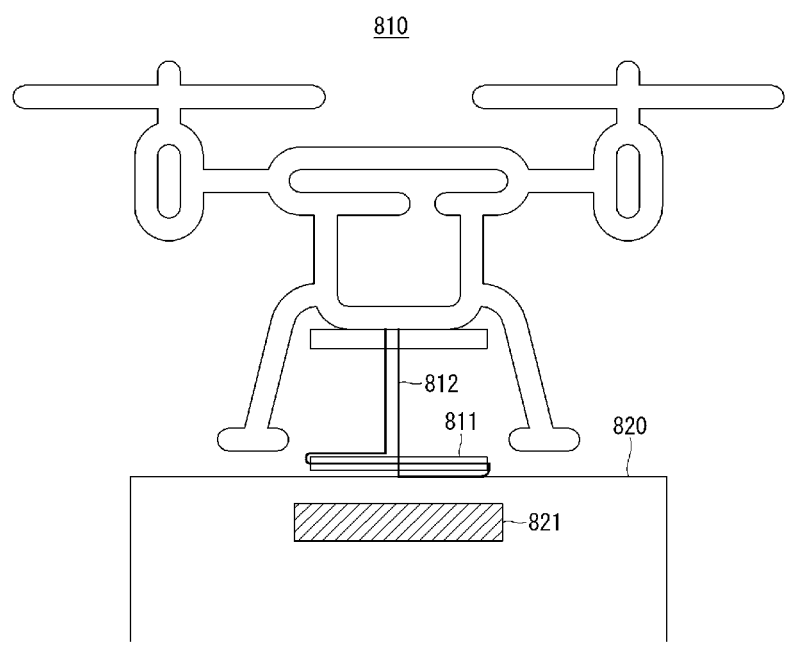
FIG. 8 is a conceptual diagram illustrating a first embodiment of an aerial vehicle in a state of landing on a wireless station.

FIG. 8 is a conceptual diagram illustrating a first embodiment of an aerial vehicle in a state of landing on a wireless station.

Referring to FIG. 8, an aerial vehicle 810 may land on a wireless station 820. In this case, a telescopic support 811 of the aerial vehicle 810 may be attached to a surface of the wireless station 820 to contract. Thus, when the telescopic support 811 is contracted, an antenna coil 812 may have a spiral shape to receive wireless power from a wireless charging transmitter 821 of the wireless station 820. In this situation, as shown in FIG. 9, the aerial vehicle 810 may take off from the wireless station 820 and fly.

Figure 9:
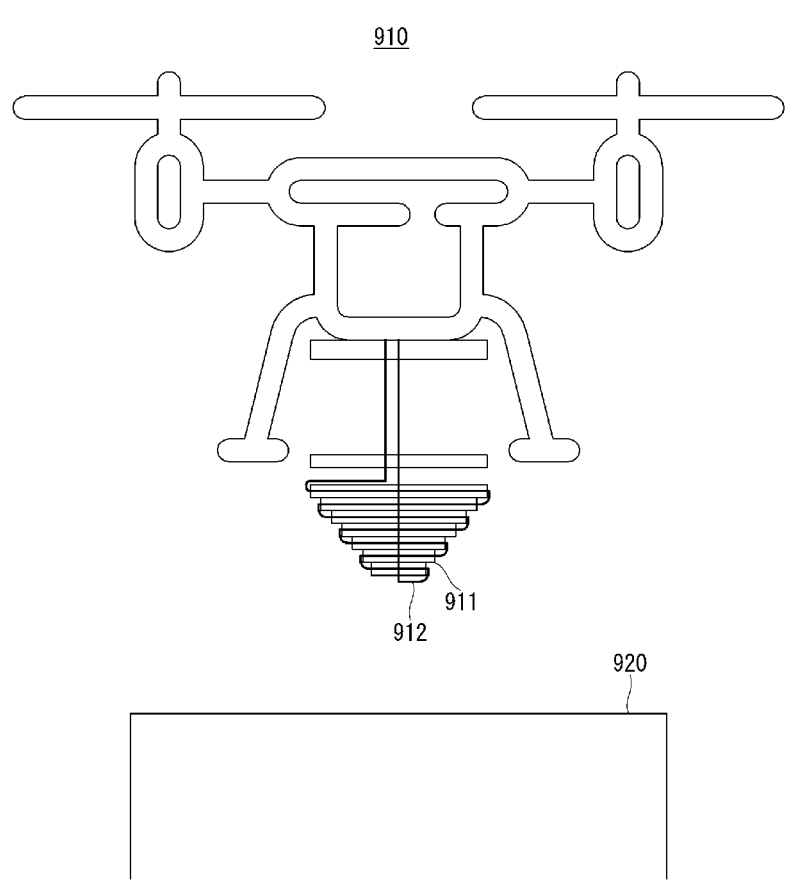
FIG. 9 is a conceptual diagram illustrating a first embodiment of an aerial vehicle in a state of taking off from a wireless station.

FIG. 9 is a conceptual diagram illustrating a first embodiment of an aerial vehicle in a state of taking off from a wireless station.

Referring to FIG. 9, an aerial vehicle 910 may take off from a wireless station 920. In this case, a telescopic support 911 of the aerial vehicle 910 may extend due to gravity while moving away from a surface of the wireless station 920. Thus, an antenna coil 912 may have a wide conical shape to receive radio waves from nearby wireless devices or wireless stations.

Referring to FIG. 1 again, the integrated receiver 180 may measure the magnitude and phase of radio waves received from the antenna 170. In addition, the integrated receiver 180 may transmit information on the measured magnitude and phase of the radio waves to the controller 160. Then, the controller 160 may transmit measurement information (i.e., the magnitude and phase) of the measured radio waves to the wireless station or a management device. Meanwhile, the integrated receiver 180 may supply the wireless power received from the antenna 170 to the rechargeable battery 150. The integrated receiver 180 may be shown in FIG. 10.

Figure 10:
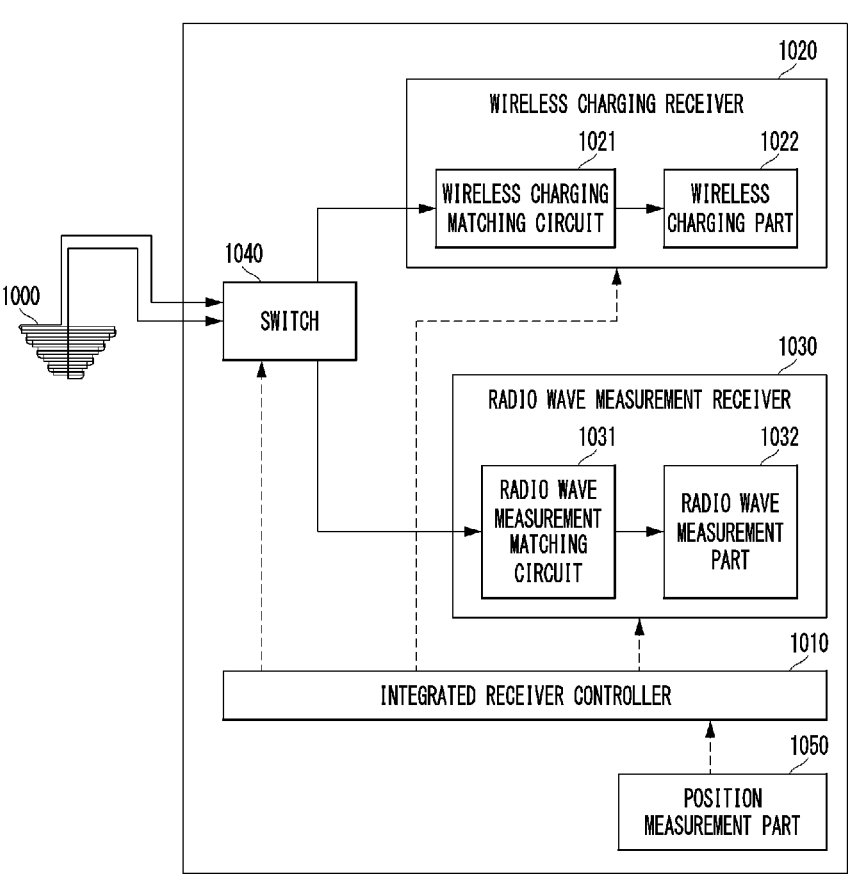
FIG. 10 is a block diagram illustrating a first embodiment of an integrated receiver.

FIG. 10 is a block diagram illustrating a first embodiment of an integrated receiver. Referring to FIG. 10, the integrated receiver may include an integrated receiver controller 1010, a wireless charging receiver 1020, a radio wave measurement receiver 1030, a switch 1040, and a position measurement part 1050. Here, the wireless charging receiver 1020 may include a wireless charging matching circuit 1021 and a wireless charging part 1022. In addition, the radio wave measurement receiver 1030 may include a radio wave measurement matching circuit 1031 and a radio wave measurement part 1032. Here, although it has been shown that the position measurement part 1050 is included in the integrated receiver, the position measurement part 1050 may be provided separately from the integrated receiver.

In the integrated receiver, the integrated receiver controller 1010 may control the wireless charging receiver 1020, the radio wave measurement receiver 1030, the switch 1040, and the position measurement part 1050. To describe the above in more detail, the integrated receiver controller 1010 may receive a request for performing wireless charging from a controller. Then, the integrated receiver controller 1010 may switch the switch 1040 to supply the wireless power received from an antenna 1000 to the wireless charging receiver 1020.

Here, when the integrated receiver controller 1010 receives the request for performing wireless charging from the controller, the integrated receiver controller 1010 may perform a wireless charging operation. Alternatively, when a position of the aerial vehicle measured by the position measurement part 1050 is around a position of the wireless station, the integrated receiver controller 1010 may perform the wireless charging operation. That is, the position measurement part 1050 may periodically or aperiodically measure the position of the aerial vehicle and provide the measured position to the integrated receiver controller 1010. In this case, the integrated receiver controller 1010 may receive and manage position information of the wireless station from the controller. Thus, the integrated receiver controller 1010 may compare the position of the aerial vehicle measured by the position measurement part 1050 with the position of the wireless station. In this case, when the position of the aerial vehicle is around the position of the wireless station, the integrated receiver controller 1010 may switch the switch 1040 to supply the wireless power received from the antenna 1000 to the wireless charging receiver 1020.

Alternatively, the integrated receiver controller 1010 may receive a request for performing a radio wave measurement operation from the controller. Then, the integrated receiver controller 1010 may switch the switch 1040 to supply the radio waves received from the antenna 1000 to the radio wave measurement receiver 1030. In this way, when the integrated receiver controller 1010 receives a request for performing the radio wave measurement operation from the controller, the integrated receiver controller 1010 may perform the radio wave measurement operation. Alternatively, when the position of the aerial vehicle measured by the position measurement part 1050 is far away from the position of the wireless station, the integrated receiver controller 1010 may perform the radio wave measurement operation. That is, the position measurement part 1050 may periodically or aperiodically measure the position of the aerial vehicle and provide the measured position to the integrated receiver controller 1010.

In this case, the integrated receiver controller 1010 may receive and manage position information of the wireless station from the controller. Thus, the integrated receiver controller 1010 may compare the position of the aerial vehicle measured by the position measurement part 1050 with the position of the wireless station. In this case, when the position of the aerial vehicle is far away from the position of the wireless station, the integrated receiver controller 1010 may switch the switch 1040 to supply the radio waves received from the antenna 1000 to the radio wave measurement receiver 1030.

The integrated receiver controller 1010 may include at least one processor and at least one memory. In addition, the integrated receiver controller 1010 may further include an input interface, an output interface, and a storage. Components included in the integrated receiver controller 1010 may be connected by a bus to communicate with each other. However, instead of a common bus, each component included in the integrated receiver controller 1010 may be connected through an individual interface or an individual bus centered on the processor of the integrated receiver controller 1010. For example, the processor of the integrated receiver controller 1010 may be connected to at least one of the memory, the input interface, the output interface, and the storage through a dedicated interface. The processor of the integrated receiver controller 1010 may execute a program command stored in at least one of the memory and the storage. The processor of the integrated receiver controller 1010 may refer to a CPU, a GPU, or a dedicated processor in which methods according to embodiments of the present disclosure are performed. Each of the memory and the storage of the integrated receiver controller 1010 may be formed as at least one of a volatile storage medium and a non-volatile storage medium. For example, the memory of the integrated receiver controller 1010 may be formed as at least one of a ROM and a RAM.

Meanwhile, the wireless charging receiver 1020 may receive wireless power from the antenna 1000 to charge a rechargeable battery. In this case, the wireless charging matching circuit 1021 of the wireless charging receiver 1020 may be positioned between the antenna 1000 and the wireless charging part 1022 to provide matching therebetween. Then, the wireless charging part 1022 of the wireless charging receiver 1020 may receive wireless power from the antenna 1000 to charge the rechargeable battery.

Next, the radio wave measurement receiver 1030 may receive radio waves from the antenna 1000 and measure the magnitude and phase of the radio waves. In this case, the radio wave measurement matching circuit 1031 of the radio wave measurement receiver 1030 may be positioned between the antenna 1000 and the radio wave measurement part 1032 to provide matching therebetween. Then, the radio wave measurement part 1032 of the radio wave measurement receiver 1030 may measure the magnitude and phase of the radio waves received from the antenna 1000 and provide the measured magnitude and phase to the controller.

Meanwhile, the switch 1040 may be switched by the integrated receiver controller 1010, and when the aerial vehicle lands on the wireless station, the switch 1040 may connect the wireless charging receiver 1020 to the antenna 1000. In addition, the switch 1040 may be switched by the integrated receiver controller 1010, and when the aerial vehicle takes off from the wireless station, the switch 1040 may connect the radio wave measurement receiver 1030 to the antenna 1000.

Next, the position measurement part 1050 may include a global positioning system (GPS) sensor and receive a GPS signal from a satellite to measure a position of the aerial vehicle, that is, GPS information. In this case, the position measurement part 1050 may periodically measure the position of the aerial vehicle. Alternatively, when a request is received from the integrated receiver controller 1010, the position measurement part 1050 may measure the position of the aerial vehicle and provide the measured position to the integrated receiver controller 1010.

Figure 11:
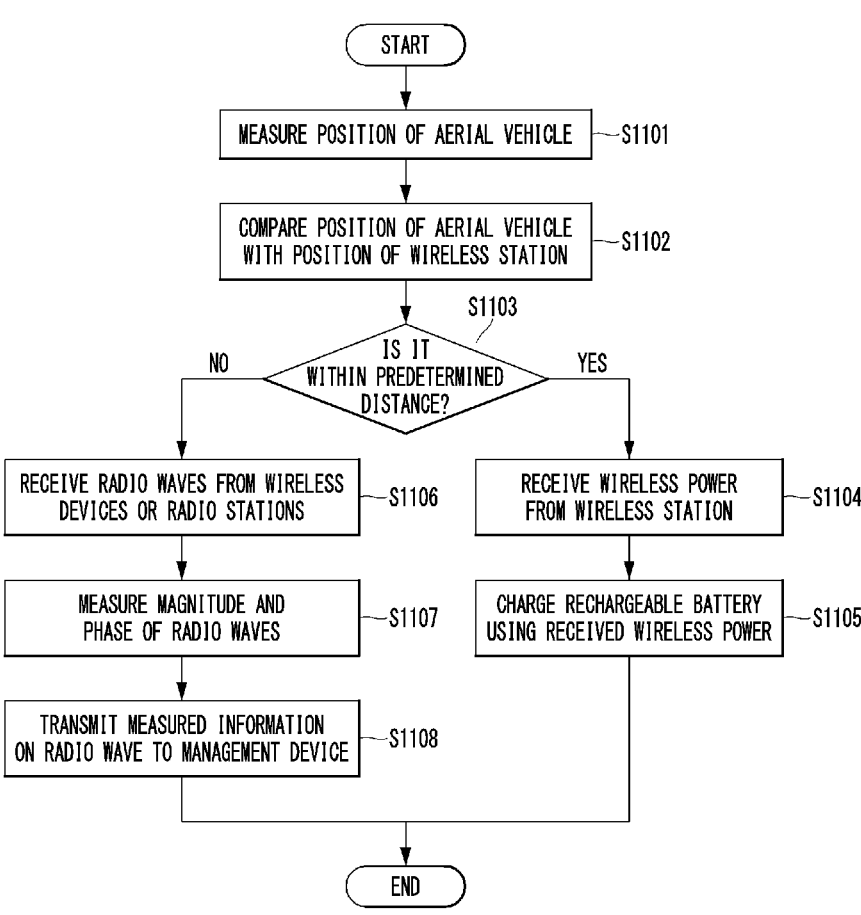
FIG. 11 is a flowchart illustrating a first embodiment of a wireless charging and radio wave measurement method using an antenna for charging and measurement.

FIG. 11 is a flowchart illustrating a first embodiment of a wireless charging and radio wave measurement method using an antenna for charging and measurement.

Referring to FIG. 11, in the wireless charging and radio wave measurement method, an integrated receiver may measure a position of an aerial vehicle (S1101). In this case, the integrated receiver may receive and manage position information of a wireless station from the controller. Accordingly, the integrated receiver may compare the measured position of the aerial vehicle with the position of the wireless station (S1102). In this case, as the result of the comparison, the integrated receiver may determine whether the position of the aerial vehicle is within a predetermined distance from the position of the wireless station (S1103).

As the result of the determination, when the position of the aerial vehicle is within a predetermined distance from the position of the wireless station, the integrated receiver may receive wireless power from the wireless station through an antenna (S1104). In addition, the integrated receiver may charge the rechargeable battery using the received wireless power (S1105). Alternatively, as the result of the determination, when the aerial vehicle is positioned at the predetermined distance or more from the position of the wireless station, the integrated receiver may receive radio waves generated from nearby wireless devices or radio stations through the antenna (S1106). Then, the integrated receiver may measure the magnitude and phase of the received radio waves and provide the measured magnitude and phase to the controller (S1107). Then, the controller may transmit the measured magnitude and phase of the radio waves to a management device or the wireless station (S1108).

Figure 12:
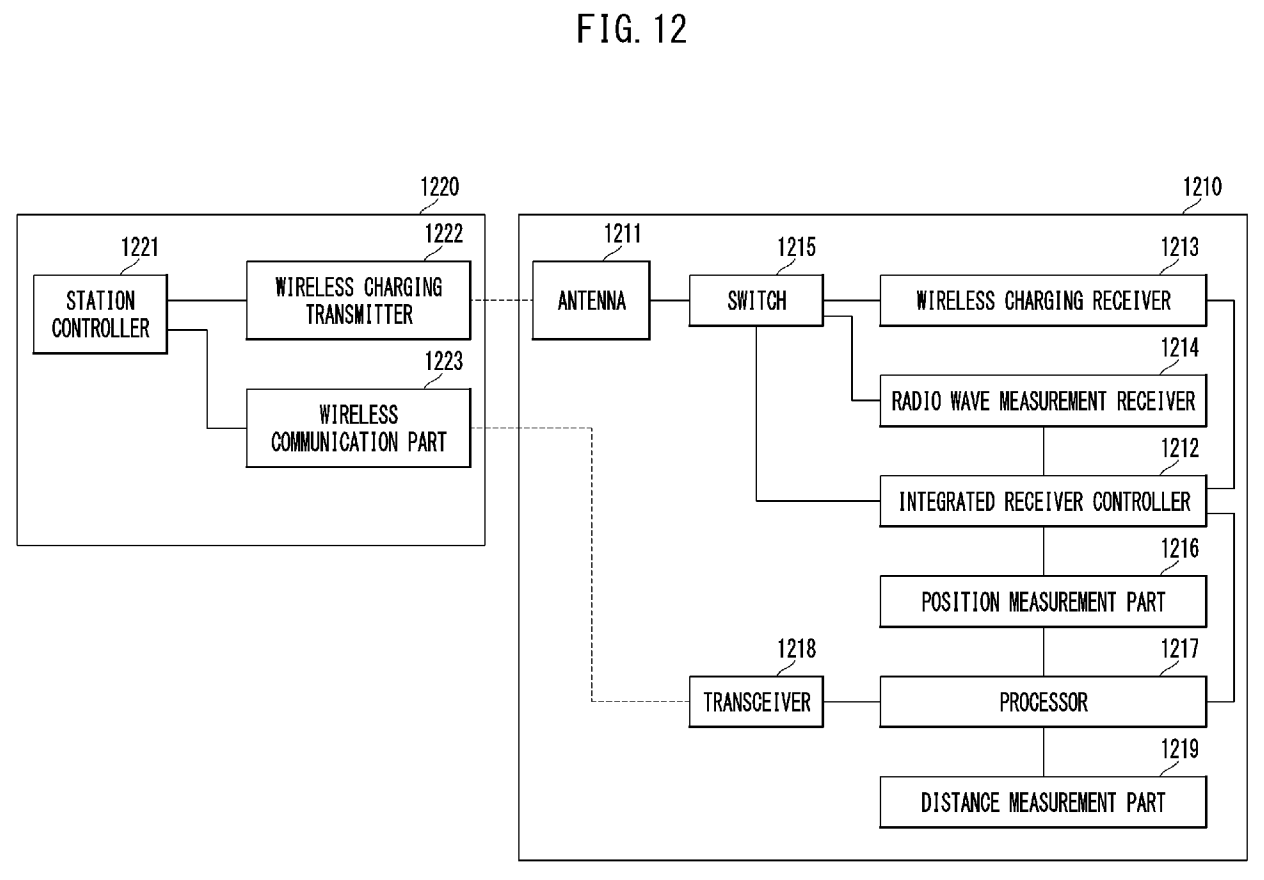

FIG. 12 is a block diagram illustrating a first embodiment of a wireless charging and radio wave measurement system.

Referring to FIG. 12, the wireless charging and radio wave measurement system may include an aerial vehicle 1210 and a wireless station 1220. The aerial vehicle 1210 may include an antenna 1211, an integrated receiver controller 1212, a wireless charging receiver 1213, a radio wave measurement receiver 1214, a switch 1215, a position measurement part 1216, a processor 1217, a transceiver 1218, and a distance measurement part 1219. In addition, the wireless station 1220 may include a station controller 1221, a wireless charging transmitter 1222, and a wireless communication part 1223.

In the above-described configuration, the position measurement part 1216 may be, for example, a GPS sensor. The position measurement part 1216 may detect a position of the aerial vehicle 1210 currently in flight and provide the detected position information (e.g., GPS information) to the integrated receiver controller 1212 and the processor 1217. Accordingly, the processor 1217 may confirm the GPS information of a current flight position. In addition, the processor 1217 may compare GPS information of a plurality of preset radio wave measurement points with the GPS information of the current flight position. Thereafter, the processor 1217 may control a driver of the aerial vehicle 1210 to allow the aerial vehicle 1210 to sequentially fly to the plurality of preset radio wave measurement points.

In addition, when the aerial vehicle 1210 arrives at any one of the radio wave measurement points, the processor 1217 may instruct the integrated receiver controller 1212 to measure radio waves of nearby wireless devices or radio stations. Then, the integrated receiver controller 1212 may switch the switch 1215 to supply the radio signal received from the antenna 1211 to the radio wave measurement receiver 1214. Accordingly, the radio wave measurement receiver 1214 may measure the magnitude and phase of the received radio waves and provide the measured magnitude and phase to the integrated receiver controller 1212. Then, the integrated receiver controller 1212 may receive the magnitude and phase of the radio waves measured by the radio wave measurement receiver 1214 and provide information on the received magnitude and phase of the radio waves to the processor 1217. Here, the integrated receiver controller 1212 may switch the switch 1215 according to an instruction of the processor 1217 to perform measurement on the radio waves received by the radio wave measurement receiver 1214.

Alternatively, the integrated receiver controller 1212 may have GPS information on the preset radio wave measurement points. Accordingly, the integrated receiver controller 1212 may compare GPS information of the current flight position with the GPS information on the plurality of preset radio wave measurement points. Thereafter, when the aerial vehicle 1210 arrives at any one of the plurality of preset radio wave measurement points, the integrated receiver controller 1212 may switch the switch 1215 to measure the radio waves received by the radio wave measurement receiver 1214.

Meanwhile, the processor 1217 may receive the magnitude and phase information of the radio waves measured by the integrated receiver controller 1212. In addition, the processor 1217 may control the distance measurement part 1219 to measure a distance to a nearby wireless device or wireless station. Here, the distance measurement part 1219 may be an ultrasonic sensor. In this case, the processor 1217 may provide the integrated receiver controller 1212 with information on the distance to the wireless device or wireless station measured using the distance measurement part 1219.

Thereafter, the processor 1217 may transmit the information on the radio wave measurement point, the information on the measured magnitude and phase of the radio waves or the information on the distance to a wireless device or a radio station to the wireless station 1220 located on the ground through the transceiver 1218. Then, the wireless communication part 1223 of the wireless station 1220 may receive the information on the radio wave measurement point, the information on the measured magnitude and phase of the radio waves or the information on the distance to a wireless device or a radio station through the transceiver 1218. In addition, the wireless station 1220 may provide the information on the radio wave measurement point, the information on the measured magnitude and phase of the radio waves or the information on the distance to a wireless device or a radio station to a management device. Alternatively, the processor 1217 may directly transmit the information on the radio wave measurement point, the information on the measured magnitude and phase of the radio waves or the information on the distance to a wireless device or a radio station to the management device located on the ground through the transceiver 1218.

Meanwhile, the processor 1217 may check the remaining amount of the rechargeable battery of the aerial vehicle 1210. The processor 1217 may determine whether the remaining amount of the rechargeable battery is less than or equal to a predetermined reference. Here, the predetermined reference may be a case in which the remaining amount of the rechargeable battery reaches a predetermined percentage of the charging capacity, for example, 70% or less. Alternatively, the predetermined reference may be a remaining amount sufficient for the aerial vehicle 1210 to move to the next measurement point, perform radio wave measurement, and then move to the wireless station 1220. In this case, the processor 1217 may determine whether the remaining amount of the rechargeable battery is sufficient for the aerial vehicle 1210 to fly to the next measurement point, perform radio wave measurement, and then move to the wireless station 1220. When the remaining amount of the rechargeable battery is not sufficient, the processor 1217 may move the aerial vehicle 1210 to the wireless station 1220. To this end, the processor 1217 may direct the aerial vehicle 1210 to fly above the wireless station 1220 using the position information of the wireless station 1220, that is, GPS information. In this case, the processor 1217 may prestore and manage the position information of the wireless station 1220, that is, the GPS information. Alternatively, the processor 1217 may make a request for the position information to the wireless station 1220 through the transceiver 1218.

Then, the wireless communication part 1223 of the wireless station 1220 may receive a position information request signal from the transceiver 1218. In addition, the wireless communication part 1223 may provide the received position information request signal to the station controller 1221. Accordingly, the station controller 1221 may receive the position information request signal from the wireless communication part 1223. Thereafter, the station controller 1221 may provide the position information of the wireless station 1220 to the transceiver 1218 through the wireless communication part 1223. Then, the transceiver 1218 may receive the position information from the wireless communication part 1223. In addition, the transceiver 1218 may provide the received position information to the processor 1217. The processor 1217 may receive the position information from the transceiver 1218. As described above, the processor 1217 may acquire and use the position information from the wireless station 1220.

Meanwhile, the processor 1217 may measure a distance to the wireless station 1220 in real time using the distance measurement part 1219. In this case, the processor 1217 may confirm that the aerial vehicle 1210 is over the wireless station 1220 using the position measurement part 1216. In addition, for landing of the aerial vehicle 1210, the processor 1217 may measure the distance to the wireless station 1220 using the distance measurement part 1219. The processor 1217 may land the aerial vehicle 1210 on the wireless station 1220 while checking a landing attitude of the aerial vehicle 1210 using the distance measured in real time through the distance measurement part 1219. As described above, when the aerial vehicle 1210 lands on the wireless station 1220, the telescopic support of the antenna part of the antenna 1211 may be attached to the surface of the wireless station to contract. Thus, a shape of the antenna coil part of the antenna 1211 may become a spiral shape. Alternatively, as described above, when the aerial vehicle 1210 lands on the wireless station 1220, the telescopic support of the antenna part of antenna 1211 may be contracted by a small motor of the coil deformation part. Thus, the shape of the antenna coil part of the antenna 1211 may become a spiral shape.

Thereafter, the processor 1217 may check the remaining amount of the rechargeable battery and provide the checked remaining amount of the rechargeable battery to the station controller 1221 of the wireless station 1220 through the transceiver 1218 and the wireless communication part 1223. The station controller 1221 may receive information on the remaining amount of the rechargeable battery from the processor 1217. Thus, the station controller 1221 may check the remaining amount of the rechargeable battery again. The station controller 1221 may transmit a charging start signal to the processor 1217 through the wireless communication part 1223 and the transceiver 1218. Thereafter, the station controller 1221 may transmit wireless power to the antenna 1211 using the wireless charging transmitter 1222.

Meanwhile, the processor 1217 may receive the charging start signal from the station controller 1221 through the wireless communication part 1223 and the transceiver 1218. In addition, the processor 1217 may instruct the integrated receiver controller 1212 to start charging. Then, the integrated receiver controller 1212 may switch the switch 1215 according to the instruction of the processor 1217 to supply the wireless power received from the antenna to the wireless charging receiver 1213. Accordingly, the wireless charging receiver 1213 may receive the wireless power received by the antenna 1211 to charge the rechargeable battery.

Thereafter, the processor 1217 may continuously check the remaining amount of the rechargeable battery of the aerial vehicle 1210. In addition, when the remaining amount of the rechargeable battery reaches a predetermined percentage of the charging capacity, for example, 90% or more, the processor 1217 may determine that charging is completed and transmit a charging completion signal to the station controller 1221 through the transceiver 1218 and the wireless communication part 1223. Accordingly, the station controller 1221 may receive the charging completion signal from the processor 1217. Thus, the station controller 1221 may control the wireless charging transmitter 1222 to stop transmission of the wireless power.

Meanwhile, when the charging of the rechargeable battery is completed, the processor 1217 may control the driver to take the aerial vehicle 1210 off from the wireless station 1220.

As described above, when the aerial vehicle 1210 takes off from the wireless station 1220, the telescopic support of the antenna part of the antenna 1211 may be separated from the surface of the wireless station to extend due to gravity. Thus, the shape of the antenna coil part of the antenna 1211 may become a conical shape. Alternatively, as described above, when the aerial vehicle 1210 takes off from the wireless station 1220, the telescopic support of the antenna part of antenna 1211 may be extended by the small motor of the coil deformation part. Thus, the shape of the antenna coil part of the antenna 1211 may become a conical shape. Therefore, the processor 1217 may move the aerial vehicle 1210 to a preset radio wave measurement point to measure radio waves of nearby wireless devices or radio stations.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An antenna for charging and measurement, comprising:
a telescopic support installed at a lower portion of an aerial vehicle and configured to contract when the aerial vehicle lands on a wireless station and extend when the aerial vehicle takes off from the wireless station; and
an antenna coil part deformed into a spiral shape when the telescopic support is contracted so that the wireless station receives wireless power and deformed into a conical shape when the telescopic support is extended to measure a radio signal.

2. The antenna of claim 1, wherein:
the telescopic support includes multi-stage tubular bodies having different diameters connected to be extendible and contractible; and
the antenna coil part includes an antenna coil which is wound in a form in which a radius of a loop is increased from a bottom surface in a direction opposite to the bottom surface along surfaces of the multi-stage tubular bodies.

3. The antenna of claim 2, wherein:
the telescopic support further includes a telescopic member installed to pass through a center of the multi-stage tubular bodies and configured to contract or extend the multi-stage tubular bodies; and
the antenna for charging and measurement further includes an antenna deformation part configured to move the telescopic member in a direction perpendicular to the bottom surface.

4. The antenna of claim 1, wherein the telescopic support is contracted by a surface of the wireless station when the aerial vehicle lands on the wireless station, and the telescopic support is extended by gravity when the aerial vehicle takes off from the wireless station.

5. A method of operating an aerial vehicle including an antenna for charging and measurement, the method comprising:
receiving wireless power from a wireless station using an antenna coil of the antenna for charging and measurement deformed into a spiral shape when the aerial vehicle lands on the wireless station; and
measuring radio signals of the surroundings using the antenna coil of the antenna for charging and measurement deformed into a conical shape when the aerial vehicle takes off from the wireless station.

6. The method of claim 5, wherein the deformation of the antenna coil into the spiral shape includes deformation in which, when the aerial vehicle lands on the wireless station, the telescopic support of the antenna for charging and measurement is contracted by a surface of the wireless station so that a shape of the antenna coil wound on the telescopic support is deformed into the spiral shape.

7. The method of claim 5, wherein the deformation of the antenna coil into the conical shape includes deformation in which, when the aerial vehicle takes off from the wireless station, the telescopic support of the antenna for charging and measurement is extended due to gravity so that a shape of the antenna coil wound on the telescopic support is deformed into the conical shape.

8. The method of claim 5, further comprising:
checking a remaining amount of a rechargeable battery provided in the aerial vehicle while the aerial vehicle takes off from the wireless station and measures radio signals;
determining whether the remaining amount of the rechargeable battery is less than or equal to a predetermined reference; and
when it is determined that the remaining amount of the rechargeable battery is less than or equal to the predetermined reference, moving the aerial vehicle to land on the wireless station.

9. The method of claim 8, wherein the predetermined reference is a remaining amount of the rechargeable battery that is less than or equal to a predetermined percentage of a charging capacity of the rechargeable battery.

10. The method of claim 8, wherein the predetermined reference is for determining whether the remaining amount of the rechargeable battery is sufficient for the aerial vehicle to move to a next radio wave measurement point, perform radio wave measurement, and then move to the wireless station.

11. The method of claim 8, further comprising:

checking a remaining amount of a rechargeable battery provided in the aerial vehicle while the aerial vehicle lands on the wireless station and receives wireless power;

determining whether the remaining amount of the rechargeable battery is greater than or equal to a predetermined reference; and when it is determined that the remaining amount of the rechargeable battery is greater than or equal to the predetermined reference, stopping reception of the wireless power at the wireless station.

12. The method of claim 5, further comprising:

measuring a distance to a radio wave source of the radio signal after the aerial vehicle takes off from the wireless station and measures the radio signal; and transmitting position information on the aerial vehicle, measurement information on the radio signal, and information on the distance of the radio source to a management device.

13. An aerial vehicle comprising:

a processor;

an antenna that performs charging and measurement;

a memory configured to electronically communicate with the processor; and instructions stored in the memory, wherein, when the instructions are executed by the processor, the instructions cause the aerial vehicle to:

receive wireless power from a wireless station using an antenna coil of the antenna for charging and measurement deformed into a spiral shape when landing on the wireless station; and measure radio signals around the aerial vehicle using the antenna coil of the antenna for charging and measurement deformed into a conical shape when the aerial vehicle takes off from the wireless station.

14. The aerial vehicle of claim 13, wherein the instructions further cause the aerial vehicle to:

check a remaining amount of a rechargeable battery provided in the aerial vehicle while the aerial vehicle takes off from the wireless station and measures radio signals;

determine whether the remaining amount of the rechargeable battery is less than or equal to a predetermined reference; and when it is determined that the remaining amount of the rechargeable battery is less than or equal to the predetermined reference, move the aerial vehicle to land on the wireless station.

15. The aerial vehicle of claim 13, wherein the instructions further cause the aerial vehicle to:

check a remaining amount of a rechargeable battery provided in the aerial vehicle while the aerial vehicle lands on the wireless station and receives wireless power;

determine whether the remaining amount of the rechargeable battery is greater than or equal to a predetermined reference; and when it is determined that the remaining amount of the rechargeable battery is greater than or equal to the predetermined reference, stop reception of the wireless power at the wireless station.

16. The method of claim 13, wherein the instructions further cause the aerial vehicle to:

measure a distance to a radio wave source of the radio signal after the aerial vehicle takes off from the wireless station and measures the radio signal; and transmit position information on the aerial vehicle, measurement information on the radio signal, and information on the distance of the radio source to a management device.

* * * * *